United States Patent Office 3,448,191
Patented June 3, 1969

3,448,191
TETRATHIODIPHOSPHONOTHIOATES AS FUNGICIDES
Glentworth Lamb, Trenton, N.J., assignor to American Cyanamid Company, Stamford, Conn., a corporation of Maine
No Drawing. Filed Jan. 17, 1968, Ser. No. 698,408
Int. Cl. A01n 9/36; C07f 9/02
U.S. Cl. 424—204                         5 Claims

ABSTRACT OF THE DISCLOSURE

A novel method for the control of fungi is disclosed employing a diphosphonothioate of the formula:

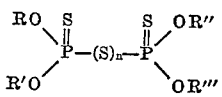

wherein R, R', R" and R''' are lower alkyl substituents, i.e., methyl, ethyl and propyl and $n$ is 3 or 4. The novel method contemplates the use of mixtures of such diphosphonothioates.

---

This invention relates to a method of controlling fungi and protecting organic materials including agronomic crops, growing and harvested, from fungal attack by applying thereto, or to the locus of the crop or material sought to be protected, a fungicidally effective amount of a compound of the formula:

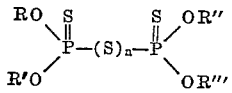

wherein R, R', R", and R''' represent lower alkyl radicals each having from 1 to 3 carbon atoms and $n$ is 3 or 4.

The diphosphonothioates and methods for their preparation are described in U.S. Patent 1,949,629, wherein the preparation of the trithiodiphosphonothioates is described by reacting free dithiophosphoric acid or salts thereof with chlorine compounds. These compounds were prepared for use as accelerators in the vulcanization of rubber. Procedures for the synthesis of the di-, tri- and tetrathiodiphosphonothioates are disclosed by L. Malatesta in his paper entitled, "Dialkyldithiophosphoric Acids and Their Chlorination Products," Gazz. Chim. Ital., 81, 596-608 (1951). In addition, J. W. Baker in U.S. Patent No. 3,012,004 indicates that di-, tri-, tetra- and pentathiodiphosphonothioates are useful as stabilizing agents for butyl rubber. British Patent 847,655 relates to pesticide formulations containing dithiodiphosphonothioates and the use thereof for controlling arachnids and insects.

In accordance with the present invention I have discovered that the polythiodiphosphonothioates contemplated for use in accordance with this invention are exceedingly effective for controlling fungi and protecting organic materials, including agronomic crops (growing and harvested), textiles, cotton, leather, paper, wood and the like from fungal attack. Moreover, I have found that these compounds are particularly well adapted for use as fungicides on living plants since they are highly effective at low rates of application against a variety of plant pathogenic fungi including the causative agents for fruit scab, leaf spot, leaf and stem rot, brown rot on stone fruit and the like. Importantly, these diphosphonothioates are non-phytotoxic at rates of application well above those required for plant protection and are readily prepared as formulated products which lend themselves to application with the types of equipment in general use for fungi control.

In general, the diphosphonothioates contemplated by this invention are synthesized by straightforward procedures. For example, compounds of the formula:

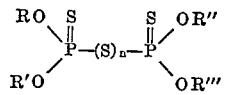

wherein $n$ is 4 and R, R', R" and R''' are equivalent and represent a lower alkyl radical, are prepared by procedures such as the reaction of sulfur monochloride ($S_2Cl_2$) with O,O-dimethyl or O,O-diethyl phosphorodithioate, preferably at low temperatures, i.e., less than 20° C. (uniformly good results have been achieved at −20° C.), and in the absence of a solvent.

Compounds wherein R's are not identical are made in similar fashion. For example, the reaction of sulfur monochloride with O-ethyl O-methyl phosphorodithioate gives a product where R and R" are methyl and R' and R''' are ethyl.

Mixed esters such as one wherein R and R' are methyl and R" and R''' are ethyl are made by reaction of sulfur monochloride with a mixture of O,O-dimethyl phosphorodithioate and O,O-diethyl phosphorodithioate. In this case the crude product also contains the products where R, R', R" and R''' are methyl and where R, R', R" and R''' are ethyl. The crude product can be used as such for control of fungi or the individual components can be separated by a convenient means such as chromatography and used individually for control of fungal diseases.

The trisulfides of the above formula (i.e., compounds in which $n$ is 3) wherein R, R', R" and R''' are identical, can be prepared by the reaction of the free dialkyl phosphorodithioic acid or salt thereof with sulfur dichloride ($SCl_2$). Where the salt of the dithio-acid is employed the reaction is generally carried out at subambient temperature and in an inert solvent, whereas reaction of the free acid with the chlorine containing compound can be carried out in the absence of solvent.

The trisulfides can also be synthesized by reaction of a disulfide of the formula:

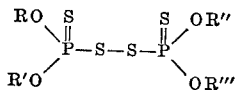

wherein R, R', R" and R''' are alkyl (C–1 to C–3), with a dialkoxyphosphinothioylsulfenyl chloride of the formula:

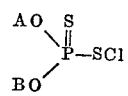

wherein A and B represent alkyl radicals C–1 to C–3 which are either the same or different. Where R, R', R" and R''' in the disulfide are identical, for example methyl, and A and B in the sulfenyl chloride are methyl, the tetramethyl trisulfide is obtained.

The mixed esters are obtained in similar manner by the the reaction of an appropriately substituted disulfide with a selected dialkoxyphosphinothioylsulfenyl chloride as graphically illustrated below.

$$(CH_3O)_2\overset{S}{\underset{\parallel}{P}}-S-S-\overset{S}{\underset{\parallel}{P}}(OCH_3)_2 + (C_2H_5O)_2\overset{S}{\underset{\parallel}{P}}-SCl \longrightarrow$$

$$(CH_3O)_2\overset{S}{\underset{\parallel}{P}}-S-S-S-\overset{S}{\underset{\parallel}{P}}(OC_2H_5)_2$$

$$\begin{matrix}CH_3O\\C_2H_5O\end{matrix}\overset{S}{\underset{\parallel}{P}}-S-S-\overset{S}{\underset{\parallel}{P}}\begin{matrix}OCH_3\\OC_2H_5\end{matrix} + \begin{matrix}CH_3O\\C_2H_5O\end{matrix}\overset{S}{\underset{\parallel}{P}}-SCl \longrightarrow$$

$$\begin{matrix}CH_3O\\C_2H_5O\end{matrix}\overset{S}{\underset{\parallel}{P}}-S-S-S-\overset{S}{\underset{\parallel}{P}}\begin{matrix}OCH_3\\OC_2H_5\end{matrix}$$

Trithiodiphosphonothioates can also be synethesized by reaction of a dialkyl phosphorodithioic acid with a halogen such as chlorine. Presumably the product results from the reaction of the disulfide and sulfenyl halide which are formed in situ.

Among the polythiodiphosphonothioates contemplated for use in the processes of the present invention are the following:

O,O,O',O'-tetramethyl tetrathiodiphosphonothioate
O,O,O',O'-tetraethyl tetrathiodiphosphonothioate
O,O'-diethyl O,O'-dimethyl tetrathiodiphosphonothioate
O,O-diethyl O'O'-dimethyl tetrathiodiphosphonothioate
O,O,O',O'-tetraisopropyl tetrathiodiphosphonothioate
O,O,O',O'-tetrapropyl tetrathiodiphosphonothioate
O,O'-diisopropyl O,O'-diethyl tetrathiodiphosphonothioate
O,O,O',O'-tetramethyl trithiodiphosphonothioate
O,O,O',O'-tetraethyl trithiodiphosphonothioate
O,O,O',O'-tetrapropyl trithiodiphosphonothioate
O,O,O',O'-tetraisopropyl trithiodiphosphonothioate
O,O'-diethyl O,O'-dimethyl trithiodiphosphonothioate and
O,O-diisopropyl O',O'-dimethyl trithiodiphosphonothioate The polythiodiphosphonothioates contemplated for use in this invention are capable of being employed as dust formulations, wettable powders, emulsifiable concentrates and in formulations adapted for low volume spraying.

Dust formulations are generally prepared by grinding together about 4 to 25% by weight of toxicant and about 75 to 96% by weight of an inert solid diluent such as kaolin, pyrophyllite, attapulgite, diatomaceous earth, fuller's earth or talc.

Wettable powders are readily prepared in similar fashion by admixing about 50 to 90 percent by weight of toxicant with about 5 to 50% by weight of a finely ground solid diluent, as described above, and about 1 to 10 percent by weight of dispersing agent, emulsifier or the like. With the compounds of the present invention an anionic-nonionic blend comprising about 2 to 5% by weight of calcium dodecylbenzenesulfonate and about 2 to 5% by weight of an alkylarylpolyethoxyethanol has been found highly effective as the dispersant.

Emulsifiable concentrates can be prepared by dissolving about 25 to 75% by weight of active ingredient in about 75 to 25% by weight of an organic solvent such as xylene, benzene, cyclohexanone or a heavy aromatic diluent such as Panasol AN–2, AN–5 or Esso HAN. In addition about 6 to 10% by weight of an emulsifier is added to the solution to assure proper dispersibility in water.

Advantageously, the compounds of the invention also lend themselves to formulation as liquids which are valuable for the most modern method of pesticide application, i.e., the method of ultra low volume spraying. In this method, the active ingredient is dissolved in a small amount of a non-evaporative solvent such as the heavy aromatic diluents mentioned above or in malathion and applied to plant foliage as discrete droplets having a mass median diameter between about 25 to 150 microns.

In these formulations, i.e., those adapted for ultra low volume spraying, the heavy aromatic diluents are further characterized by the following physical properties:

(A) a flash point above about 125° F.
(B) an aromatic content between about 60 and 100%
(C) a specific gravity at 60°/60° F. between about 0.880 and 1.5
(D) and a mixed aniline point between about 30° F. and 95° F.

Such formulations themselves are further characterized by the omission of surfactants, emulsifiers, wetting agents or the like normally included in the traditional type formulations.

In order that the present invention be more fully understood the following examples are given primarily by way of illustration. No specific details or enumerations contained therein should be construed as limitations on the present invention, except so far as they appear in the appended claims. All parts and percentages are by weight unless otherwise specifically designated.

EXAMPLE 1

A stirred 40 percent solution of sodium dimethyl phosphorodithioate in water is cooled with ice and treated with surfur dichloride. The temperature of the mixture is maintained below 10° C. and the mole ratio of phosphorodithioate to sulfur dichloride is 2 to 1. The oily layer is separated from the mixture, extracted with ether, dried and the ether removed by evaporation. O,O,O',O'-tetramethyl trithiodiphosphonothioate, M.P. 51.5–52.5° C. is obtained.

The product is a white crystalline substance.

O,O,O',O'-tetraethyl trithiodiphosphonothioate is obtained in the same manner by substituting the sodium diethyl phosphorodithioate for the dimethyl homologue. Reaction of a mixture of sodium dimethyl phosphorodithioate and sodium diethyl phosphorodithioate with sulfur dichloride under these conditions provides O,O-dimethyl O',O'-diethyl trithiodiphosphonothioate. The reaction product also contains O,O,O',O'-tetramethyl trithiodiphosphonothioate and O,O,O',O'-tetraethyl trithiodiphosphonodithioate.

EXAMPLE 2

O,O,O',O'-tetraethyl tetrathiodiphosphonothioate is prepared by reaction of 66.5 g. of $S_2Cl_2$ with 187 g. (1 mole) of O,O-diethyl phosphorodithioate at −20° C. The mass solidifies the oily residue is then separated from the solid and the solid is washed with cold methanol. On recrystallization from methanol the product has a melting point of 43° C.

Following this same procedure and substituting O,O-dimethyl phosphorodithioate for the diethyl phosphorodithioate yields a white crystalline product, M.P. 44.5–45.5° C., O,O,O',O'-tetramethyl tetrathiodiphosphonothioate.

EXAMPLE 3

The foliage of Bonnie Best tomato plants with 4 true leaves, and of Early Marketer cucumber plants with 2 true leaves are sprayed with solutions of the test compound at rates of 1,000, 500, 250 or 100 p.p.m. to "run-off." The plants are allowed to dry and then sprayed with mixed inoculum of *Phytophthora infestans* (late blight of tomato) and *Colletotrichum lagenarium* (anthracnose of cucumber). Immediately the inoculated plants are placed in a constant temperature cabinet at 62° F. with a moisture-saturated atmosphere. After 24 hrs. the temperature is raised to 70° F. and held there for 72 hrs. at which time the plants are removed to the greenhouse. Readings on disease control are made 7 days after inoculation. Disease incidence is rated as follows:

5=Complete control, no disease on treated foliage
4=Trace
3=Slight
2=Moderate
1=Severe, no disease control

TABLE I

Anthracnose

| Compound | Rates in p.p.m. | | |
|---|---|---|---|
| | 1,000 | 500 | 100 |
| $(CH_3O)_2\overset{S}{\overset{\|}{P}}-S-S-S-S-\overset{S}{\overset{\|}{P}}(OCH_3)_2$ | 5 | 5 | 4 |
| $(CH_3O)_2\overset{S}{\overset{\|}{P}}-S-S-S-\overset{S}{\overset{\|}{P}}(OCH_3)_2$ | 5 | 5 | 4 |
| $(C_2H_5-)_2\overset{S}{\overset{\|}{P}}-S-S-S-\overset{S}{\overset{\|}{P}}(OC_2H_5)_2$ | N.T. | 4 | 3 |

Late Blight

| Compound | Rates in p.p.m. | | |
|---|---|---|---|
| | 1,000 | 500 | 250 |
| $(CH_3O)_2\overset{S}{\overset{\|}{P}}-S-S-S-S-\overset{S}{\overset{\|}{P}}(OCH_3)_2$ | 5 | 5 | 3 |
| $(CH_3O)_2\overset{S}{\overset{\|}{P}}-S-S-S-\overset{S}{\overset{\|}{P}}(OCH_3)_2$ | 5 | 5 | 3 |

N.T.=No Test

No phytotoxicity was noted with any of the above compounds at the highest rates tested.

EXAMPLE 4

The effectiveness of the compounds of the invention for controlling apple scab (caused by *Venturia inaequalis*) and powdery mildew (caused by *Podosphoera leucotricha*) on apple trees is demonstrated in the following tests wherein apple seedlings from Red Delicious mother plant in 4 inch clay pots and about 12 weeks old are sprayed with test compound in acetone/water, 50/50 solution at rates of 1200, 600, and 300 p.p.m. with 2 reps. at each rate.

After deposit has dried, the trees are inoculated with a water suspension of conidia from scabby apple leaves and placed in a constant temperature cabinet at 72° F. with a moisture-saturated atmosphere for 96 hrs. Trees are then removed to the greenhouse, and data recorded 18 days after time of inoculation scab organism *Venturia inaequalis*.

Table II.—Disease ratings

Tetramethyltetrathiodiphosphonothioate: P.p.m.
Clean _____ 1200
Clean _____ 600
Clean _____ 300

I claim:
1. A method for controlling fungi comprising contacting said fungi with a fungicidally effective amount of a compound of the formula

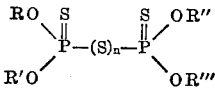

wherein R, R', R", and R'" are lower alkyl having from 1 to 3 carbon atoms and $n$ is 3 or 4.
2. A method according to claim 1 wherein R, R', R" and R'" are methyl and $n$ is 4.
3. A method according to claim 1 wherein R, R', R" and R'" are methyl and $n$ is 3.
4. A method according to claim 1 wherein R and R' are methyl, R" and R'" are ethyl and $n$ is 4.
5. A method according to claim 1 wherein R, R', R" and R'" are ethyl.

References Cited

UNITED STATES PATENTS 2,983,644  5/1961  Willard et al. _____ 167—22
3,012,004  12/1961  Baker _____ 260—45.7

ALBERT T. MEYERS, *Primary Examiner.*

V. D. TURNER, *Assistant Examiner.*

U.S. Cl. X.R.

260—926